US011531698B2

(12) United States Patent
Allen et al.

(10) Patent No.: US 11,531,698 B2
(45) Date of Patent: Dec. 20, 2022

(54) SYSTEM AND METHOD FOR SELECTING MEDIA CONTENT

(71) Applicant: Spotify AB, Stockholm (SE)

(72) Inventors: Vince Allen, Stockholm (SE); Deepti Deshpande, Stockholm (SE)

(73) Assignee: Spotify AB, Stockholm (SE)

( * ) Notice: Subject to any disclaimer, the term of this patent is extended or adjusted under 35 U.S.C. 154(b) by 118 days.

(21) Appl. No.: 16/123,300

(22) Filed: Sep. 6, 2018

(65) Prior Publication Data

US 2020/0082019 A1    Mar. 12, 2020

(51) Int. Cl.
*G06F 16/635* (2019.01)
*H04N 21/4545* (2011.01)
*H04N 21/45* (2011.01)
*H04N 21/454* (2011.01)
*G06F 16/638* (2019.01)
*G06F 16/683* (2019.01)

(52) U.S. Cl.
CPC .......... *G06F 16/635* (2019.01); *G06F 16/639* (2019.01); *G06F 16/685* (2019.01); *H04N 21/4532* (2013.01); *H04N 21/4542* (2013.01); *H04N 21/45457* (2013.01)

(58) Field of Classification Search
CPC .... G06F 16/635; G06F 16/685; G06F 16/639; H04N 21/4532; H04N 21/4542; H04N 21/45457
USPC ...................................................... 707/754
See application file for complete search history.

(56) References Cited

U.S. PATENT DOCUMENTS

| | | | |
|---|---|---|---|
| 6,987,221 B2* | 1/2006 | Platt | G10H 1/0058 84/601 |
| 7,711,838 B1* | 5/2010 | Boulter | G06Q 30/0631 709/231 |
| 8,094,891 B2* | 1/2012 | Andreasson | G06K 9/00308 382/118 |
| 8,700,795 B2* | 4/2014 | Boulter | G06Q 20/123 709/231 |
| 9,767,827 B2 | 9/2017 | Paquier et al. | |
| 10,141,010 B1* | 11/2018 | Nichols | G10L 25/51 |
| 10,560,758 B1* | 2/2020 | Bapna | H04N 21/23424 |

(Continued)

FOREIGN PATENT DOCUMENTS

| | | |
|---|---|---|
| CN | 101441667 | 4/2011 |
| WO | 2017/048450 | 3/2017 |

OTHER PUBLICATIONS

Fields "Contextualize your listening: The Playlist as Recommendation Engine", Department of Computing, Goldsmiths, University of London, (2011) 164 pages.

(Continued)

*Primary Examiner* — Ashish Thomas
*Assistant Examiner* — Abdullah A Daud
(74) *Attorney, Agent, or Firm* — Merchant & Gould P.C.

(57) ABSTRACT

Methods, systems, and computer programs for generating a playlist of media content items without explicit content. A vector space is created that represents explicit and non-explicit tracks in the same playlists created by other users and then tracks are filtered based on cosine distance between the "seed tracks" and all the tracks in the aforementioned playlist. The explicit tracks are filtered out, and tracks are sorted based on the affinity of the user to the artist.

18 Claims, 11 Drawing Sheets

(56) References Cited

U.S. PATENT DOCUMENTS

| | | | |
|---|---|---|---|
| 2004/0002310 A1* | 1/2004 | Herley | G06F 16/639 |
| | | | 455/180.1 |
| 2006/0092282 A1* | 5/2006 | Herley | H04N 21/25891 |
| | | | 348/207.99 |
| 2006/0265421 A1* | 11/2006 | Ranasinghe | G06F 16/68 |
| 2006/0294131 A1* | 12/2006 | Hsieh | G11B 27/034 |
| | | | 707/999.102 |
| 2009/0116684 A1* | 5/2009 | Andreasson | G06K 9/00308 |
| | | | 382/100 |
| 2012/0246174 A1* | 9/2012 | Spears | G06F 16/285 |
| | | | 707/749 |
| 2012/0311625 A1* | 12/2012 | Nandi | H04N 21/4532 |
| | | | 725/28 |
| 2013/0031162 A1* | 1/2013 | Willis | H04L 67/02 |
| | | | 709/203 |
| 2013/0031216 A1 | 1/2013 | Willis et al. | |
| 2014/0223099 A1* | 8/2014 | Kidron | G06F 12/0806 |
| | | | 711/118 |
| 2015/0070516 A1* | 3/2015 | Shoemake | H04N 21/4542 |
| | | | 348/207.11 |
| 2015/0106404 A1* | 4/2015 | Boulter | G06F 3/04842 |
| | | | 707/793 |
| 2016/0034512 A1* | 2/2016 | Singhal | G06F 16/35 |
| | | | 707/741 |
| 2016/0093316 A1* | 3/2016 | Paquier | G10L 25/48 |
| | | | 704/278 |
| 2016/0196345 A1* | 7/2016 | Kreifeldt | G06F 16/637 |
| | | | 707/738 |
| 2016/0335266 A1 | 11/2016 | Ogle et al. | |
| 2018/0150897 A1* | 5/2018 | Wang | G06F 16/435 |
| 2018/0239823 A1* | 8/2018 | Singh | G06Q 50/01 |
| 2018/0268054 A1* | 9/2018 | Mustain | G06F 16/635 |
| 2018/0341704 A1* | 11/2018 | Barkan | G06F 16/637 |

OTHER PUBLICATIONS

Unknown "Turn off explicit content in Apple Music on Android", 2 pages, retrieved Mar. 21, 2018, http://support.apple.com/en-us/HT205255.

Unknown "Block explicit lyrics in music subscription services", 4 pages, retrieved Mar. 21, 2018, http://www.cnet.com/how-to/block-explicit-lyrics-in-music-subscription.

\* cited by examiner

| track_uri | parental_warning |
|---|---|
| spotify:track:7fHXxcE8SZEvBTCWxxOUyL | Not explicit |
| spotify:track:7tAXHZdp9iJpcYrHn7MZqfo | Not explicit |
| spotify:track:0fnXh4PmOhgTzBui7ZL6 | Not explicit |
| spotify:track:4iLqG9Se.t5mt0cSPICSjxv | Not explicit |
| spotify:track:0jxnyOdhgjUwokp5GbqEaA | Not explicit |

Figure 7

| track_uri | parental_warning | distance |
|---|---|---|
| spotify:track:5yuShhu7OmtHxYOyLxC0LO | Explicit | 0.0 |
| spotify:track:7HXacE8GZEvBTCWxxOUyL | Not explicit | 0.043058 |
| spotify:track:7lAXHZdp9UpcYnfm7MZqb | Not explicit | 0.099803 |
| spotify:track:6fmXh4PmOhgTzBuI72L6 | Not explicit | 0.193489 |
| spotify:track:4iLrjG9SeJSnt0cSPICSjsv | Not explicit | 0.228769 |
| spotify:track:QjaryOdhgiUwolp5GkgEaA | Not explicit | 0.342324 |

Figure 8

| track_uri | parental_warning | distance | artist_affinity |
|---|---|---|---|
| spotify:track:71AXHZdp98jpcYtHn7MZqfo | Not explicit | 0.1098803 | 3.80091 |
| spotify:track:7fHXacE8GZEv8TCWxxOUyL | Not explicit | 0.043056 | 1.3453 |
| spotify:track:6fmXh4PrmOhgTzBui72L6 | Not explicit | 0.193499 | 0.0 |

SYSTEM AND METHOD FOR SELECTING MEDIA CONTENT

BACKGROUND

People's motivation to listen to explicit music is likely driven more by an artist or genre affinity than a desire to hear explicit lyrics. Yet, songs with explicit lyrics are prevalent in user-created playlists. Existing techniques for managing media content are generally based on media items that are marked or tagged with content ratings. For example U.S. Pat. Pub. No. 2012/0311625A1, titled "Systems and Methods for Managing Media Content based on Segment-Based Assignment of Content Rating" describes a technique to assign a content rating to segments of media content. U.S. Pat. No. 9,767,827, titled "Management, Replacement and Removal of Explicit Lyrics During Audio Playback" explains how songs that contain explicit lyrics may be marked as including explicit lyrics in their metadata (e.g., within MP3 or AAC files).

Modern audio players are able to prevent the playing of songs with explicit lyrics based on such criteria. If a user desires to listen to a non-explicit segment of the song or a non-explicit version of a song, the user needs to interact with a user interface and use significant computing resources to either determine such segments or obtain the new version of the song.

Existing interfaces such as those described above allow a user to switch out or remove unwanted audio while playing an audio stream by configuring the audio player to playback an alternate audio stream without explicit content. Typical audio players provide a user interface that allows a user to select whether or not to remove unwanted audio when playing audio streams. The audio player may allow the user to specify that unwanted audio should be removed from all audio streams being played, or alternatively may allow a user to specify individual audio streams that should have unwanted audio removed during playback, or both. Such audio players also provide an interface that allows a user to select a corresponding version of the song that does not contain the explicit language.

Many music-streaming applications provide recommendations based on the listening history and/or activity of the user. These features typically analyze such user activity to suggest content among a vast catalog of media that is predicted to match the listening or viewing preferences of the user.

Neither existing players nor media distribution platforms use media content that includes explicit content to create a playlist of media content items based on the listening history of the user, which may or may not include explicit content, to create a list of media content items without any explicit content.

The problem with such audio players and applications is that they do not take into consideration the metadata of the audio content that is unrelated to whether the content contains explicit language together with the activity of the corresponding media content streaming account. Audio players further lack an interface that can communicate a command to a media distribution platform to instruct it to predict and generate a playlist based on such metadata and activity data. A related technical problem involves the amount of processing time and resources required by existing audio players and media distribution platforms to obtain alternative media content items. Existing techniques typically wait for a user to provide a request and then process the request. Similarly, existing techniques unnecessarily filter out media content items that are not desired rather than affirmatively selecting media content items that are predicted to be appropriate for a playlist. The more an operator must flag as inappropriate or remove from a playlist an undesirable song the more resources are required. Yet another technical problem is that while the media items may be tagged with metadata, nothing in such metadata relates to user activity related to such media items. Thus further decreasing the media player and/or media distribution platform's ability to efficiently and correctly select relevant media items to be played back.

Another technical problem solved is calculating an affinity score to determine which media content items the user may like best.

SUMMARY

The present system and method provides a solution to the above technical problems by generating a playlist composed of songs with non-explicit lyrics based on songs with explicit lyrics.

In general terms, the present disclosure is directed to a system and method for creating a clean-programmed set of media content items based on the listening profile of the user. The user simply selects to listen to a "Wash Your Mouth Out" playlist. In another embodiment, while a user is listening to a song, the user is able to switch to listen to non-explicit songs. The currently played song is the "seed song," which is used to create a playlist (or individual songs) that are most similar to the seed song, but without explicit lyrics.

To achieve this, a multi-step process is employed. A vector space is created that represents explicit and non-explicit songs in the same playlists created by other users. Playlists with more than, e.g., 50% explicit songs, are used to create the vector space. Songs are filtered based on cosine distance between the "seed song" and all the songs in the aforementioned playlist. In turn, the explicit songs are filtered out. Songs are sorted based on the affinity of the user to the artist. The songs with the highest affinity are played first.

In a first embodiment, a method of playing media content items is described. The method includes receiving a seed media content item at an information storage and media distribution platform from a datastore of a plurality of media content items. A vector space comprising the seed media content item and a plurality of related media content items is created. A similarity score between the seed media content item and the plurality of related media content items is calculated. The explicit media content items are removed from the plurality of related media content items to create a plurality of clean media content items. An affinity score for each of the plurality of clean media content items is determined. Finally, media content items are played from the plurality of clean media content items based on the affinity score and the similarity score of the media content item.

In another embodiment, a system comprising a non-transitory memory and a processing device coupled to the memory and constructed to execute the process steps stored in the memory. The process steps include steps, which when executed by the processor cause the processor to perform the following steps. Receive a seed media content item at an information storage and retrieval platform from a datastore of a plurality of media content item. Create a vector space comprising the seed media content item and a plurality of related media content items. Calculate a similarity score between the seed media content item and the plurality of related media content items. Remove explicit media content items from the plurality of related media content items to create a plurality of clean media content items. Determining an affinity score for each of the plurality of clean media content items. Play a media content item from the plurality of clean media content items based on the affinity score and the similarity score of the media content item.

DETAILED DESCRIPTION

Various embodiments will be described in detail with reference to the drawings, wherein like reference numerals represent like parts and assemblies throughout the several views.

The example embodiments described herein provide systems, methods, and computer products for recommending media suitable for a designated user. This description is not intended to limit the application to the example embodiments presented herein. In fact, after reading the following description, it will be apparent to one skilled in the relevant art(s) how to implement the following example embodiments in alternative embodiments (e.g., in domains outside of media recommendation).

The system and method are generally directed towards procuring and generating non-explicit (or clean) media content items that are based on a seed media content item containing explicit media content. As described herein, consuming media content items may include one or more of listening to audio content, watching video content, or consuming other types of media content. For ease of explanation, the embodiments described in this application are presented using specific examples. For example, audio content (and in particular music) is described as an example of one form of media consumption, and examples commonly refer to "songs" or "tracks" are representative of a media content item. An example system provides a way of either playing a track or creating a playlist composed of tracks with non-explicit lyrics based on a track with explicit lyrics.

Media content items may include audio and video content. Examples of audio content include songs, albums, playlists, radio stations, podcasts, audiobooks, and other audible media content items. Examples of video content include movies, music videos, television programs, and other visible media content items. In many cases, video content also includes audio content.

Many users desire a personalized media consuming experience. For example, a user can access almost limitless catalogs of media content items through various free or fee-based media delivery services, such as media streaming services. Users can use mobile devices or other media playback devices to access large catalogs of media content items. Due to such large collections of media content items, it is desired to make it possible to customize a selection of media content items to fit well with users' individual desire to consume their favorite media content items while also providing an experience without explicit content.

In an embodiment, a playlist is created that includes media content items without explicit content, and does not include content that merely has the explicit content removed or bleeped (the clean version of the media content item). In another embodiment, a playlist is created that includes media content items without explicit content, including clean versions of media content items.

It should be noted that tracks selected or playlists created by the system and method described herein are not just the clean version of the seed track. The system is not just directed towards presenting only the clean version of tracks already included in selected playlists. The system is capable of selecting songs that are similar to the seed track that are not explicit.

Figure 1:
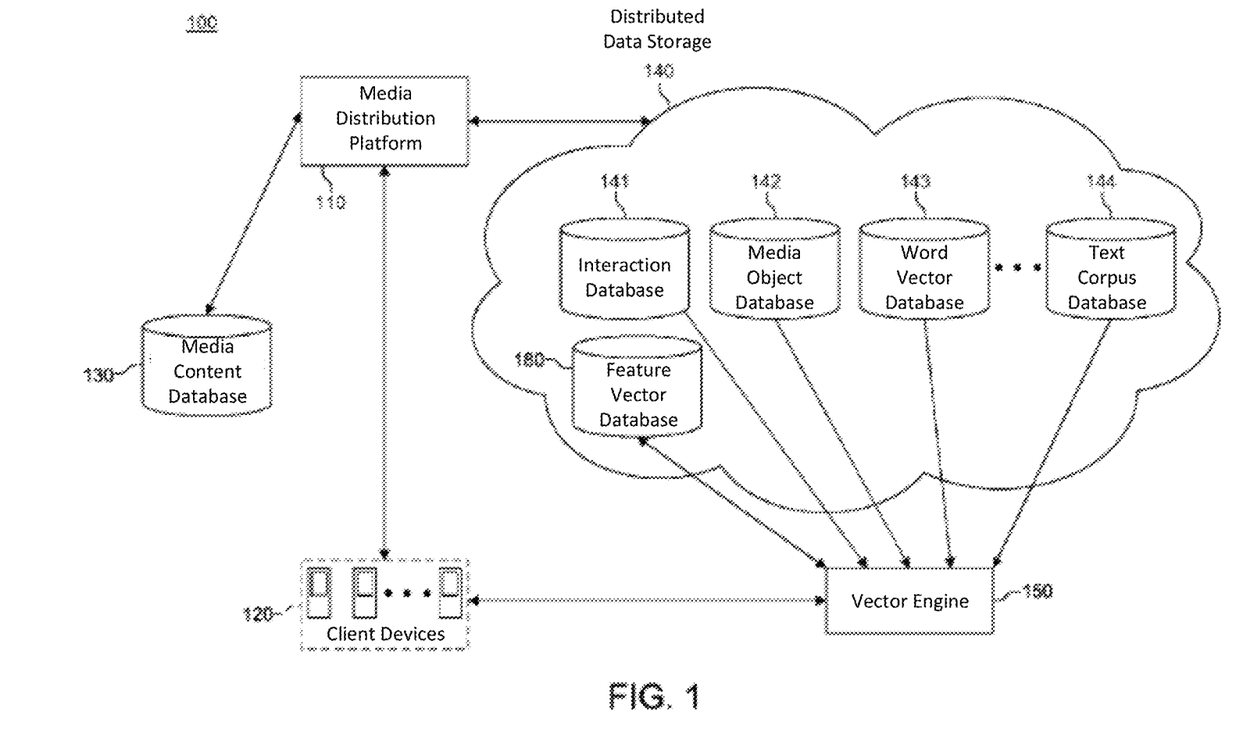
FIG. 1 is an architectural overview of a system for recommending non-explicit media content according to an example embodiment.

FIG. 1 is an architectural overview of a system 100 for recommending media content items, for example tracks, based on a specified seed track according to an example embodiment.

Media distribution platform 110 is a platform for distributing digital media content to end-users on client devices 120 each client device communicatively coupled to media distribution platform 110. Media distribution platform 110 may deliver a variety of media objects, including, but not limited to songs, audiobooks, podcasts, videos, movies and TV shows. Media content items are stored in the form of media files in media content database 130 communicatively coupled to media distribution platform 110. Media distribution platform 110 may distribute media content items to client devices 120 as downloadable objects (i.e. media files), live streaming objects (e.g. radio stations or video channels), on-demand streaming media, and so forth. Media distribution platform 110 may also deliver media-related applications and services to client devices 120. Media distribution platform 110 is able to store and retrieve data from distributed data storage 140.

Client devices 120 are computer hardware and/or software that allow an end-user to access and interact with the media content and services made available by media distribution platform 110. Client devices 120 access the media stored in the media content database 130 and the data of distributed data storage 140 through the media distribution platform 110.

Media content database 130 stores a catalog of media content items in the form of media files, as well as metadata associated with the media content items, such as song or video titles, artist names, song or video durations, and associated album titles.

Distributed data storage 140 stores data used by and collected from media distribution platform 110. Distributed data storage 140 may be a distributed file system such as, for example, any known or future known distributed file system and associated software framework such as an Apache Hadoop Distributed File System (HDFS) (i.e. "Hadoop Cluster") and the Apache MapReduce framework. Data from distributed data storage 140 may be queried or processed using a cluster-computing framework such as Apache Spark. Examples of data stored in distributed data storage 140 include, but are not limited to, interaction database 141, media object database 142, word vector database 143, text corpus database 144, and feature vector database 180.

Interaction database 141 includes data collected from interactions performed by end-users on media distribution platform 110 (e.g. songs or videos played, playlists created, applications executed, etc.). These interactions can be performed, for example, using one of client devices 120 and may be collected into interaction histories (e.g. media sessions, or viewing and listening histories). Interaction histories are data structures that contain metadata corresponding to media objects from media content database 130 that an individual user has interacted with over a time period. This metadata can include, for example, media content identifiers for each of the media content items. Media content identifiers can be alphanumeric characters or other representations that, when processed, link metadata to an associated media content item. Interaction histories can be used to provide personalized media recommendations to end-users, for example, by maintaining a taste profile for each end-user based on analysis of the interaction histories.

Media object database 142 are data structures that contain metadata associated with a finite set of media content items (e.g. a music or video playlist, a saved favorites list or a media queue). The media object database 142 can be user-generated at individual ones of client devices 120 (as described in more detail with respect to FIG. 3 below), automatically generated, or curated by an editorial staff.

Word vector database 143 include numerical vector representations of words and phrases (i.e. word embedding). They represent words in an n-dimensional space, each dimension quantifying a latent feature of the words based on co-occurrences of the words in a text corpus, such as a collection of documents, articles, or books. Word vector database 143 can be created and processed by neural networks to group similar words based on context and to perform mathematical calculations on words. In the example embodiments described herein, word vector database 143 can include pre-trained word or phrase vectors, for example those made publicly available as part of the Google Word2Vec toolset (https://code.google.com/p/word2vec/).

Text corpus database 144 includes training text data that can be inputted into a neural network or vector encoding toolset (e.g. a vector model) to generate word vectors. Text corpus data may include any type of document or paragraph containing words in a useful context. For example, the text corpus data may include books, encyclopedia entries, or news articles. In other examples, the text corpus data may include text from media-related editorial content such as music or film related reviews, news articles, or social media commentary. This media-related editorial content can, for example, be periodically scraped from the web.

Vector engine 150 includes a trainable neural network that generates feature vectors for various objects and performs mathematical computations on the generated feature vectors. The neural network, for example, implements known or future known algorithms or toolsets such as a vector model toolset and modifications thereof. As described more fully below with respect to FIG. 3, in addition to using word vector database 143 and text corpus database 144, vector engine 150 can be trained using interaction database 141 and media object database 142. Vector engine 150 can initialize latent feature vectors for words, individual media object lists, individual media content items, and individual interaction histories. Mathematical computations, such as computational nudging, can be performed on the feature vectors based on co-occurrences of media content items in the media content lists, co-occurrences of media content items or media content lists in interaction histories, or co-occurrences of words in the titles of the media content lists or in the metadata associated with the media content items. Once trained, vector engine 150 is able to recommend media content items by performing additional computations on the various feature vectors, for example, by calculating cosine similarities between the feature vectors.

Feature vector database 180 stores feature vectors generated by vector engine 150. The feature vectors can be periodically updated through computations performed by vector engine 150 based on new contexts (i.e. new co-occurrences of objects corresponding to the feature vectors). The stored feature vectors may also be accessed and used by other applications external to vector engine 150.

Figure 2:
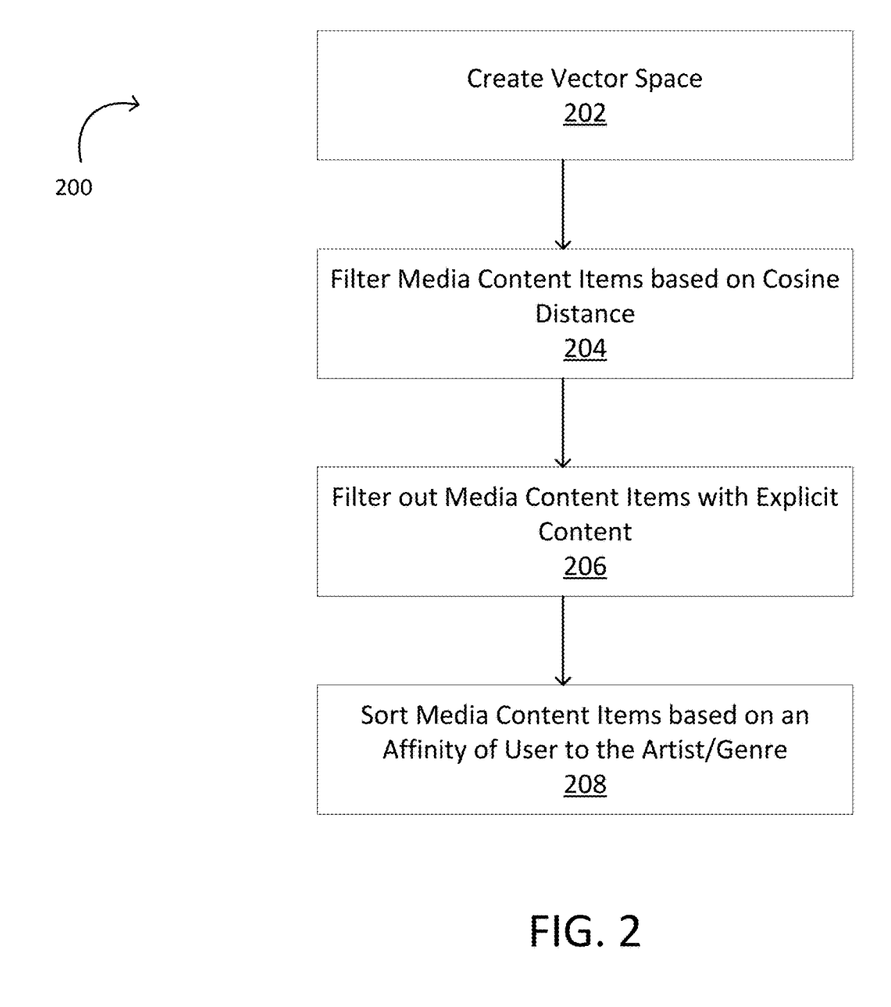
FIG. 2 is an example method for generating non-explicit media content according to an example embodiment.

FIG. 2 illustrates an example method 200 of creating a playlist of non-explicit media content items, such as non-explicit tracks, based on a seed track containing explicit lyrics. It should be noted that throughout the specification, tracks are used as an example of media content items, however, this is not to be seen as limiting First, at step 202, a vector model is created. The model contains all playlists with greater than 50% explicit tracks. The model uses playlists created by all users in the application, attempting to uncover latent structure in millions of combinations of tracks.

For example, a user of a media streaming service can create a playlist or a playlist can be created and/or edited by a group of users together to make it a collaborative playlist. In some embodiments, user-created playlists can be available to a particular user only, a group of users, or to the public based on a user-definable privacy setting.

In addition or alternatively, at least some of the playlists are created by a media streaming service provider. In some embodiments, a provider-created playlist can be customized to a particular user or a particular group of users. By way of example, a playlist for a particular user can be automatically created based on the listening history of the user (e.g., the taste profile of the user) and/or listening history of other users with similar tastes. In other embodiments, a provider-created playlist can be configured to be available for the public in general. Provider-created playlists can also be sharable with other users. In the context of the present system and method, these playlists are not limited to content including explicit and non-explicit content.

Next, at step 204, tracks are filtered based on the cosine distance to the seek track. A list of tracks is created in order of higher cosine values to lower cosine values. At step 206, tracks with explicit content are filtered out from the list. Only the tracks without explicit content remain on the list. At step 208, the tracks are sorted based on an affinity to the listen history of the user. For example, tracks are sorted based on artist affinity to the user, or to genre affinity to the user.

Artist affinity (or an affinity based on other attributes) is determined by the taste profile of the user. The taste profiles contain records indicating media content tastes of users. A taste profile can be associated with a user and associated user ID, and used to maintain an in-depth understanding of the music activity and preference of that user, enabling personalized recommendations, taste profiling, and a wide range of social music applications. Libraries and wrappers can be accessed to create taste profiles from a media library of the user, social website activity and other specialized databases to mine music preferences.

In some embodiments, each taste profile is a representation of musical activities, such as user preferences and historical information about the consumption of media content of the user, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," "sexy," etc.

In addition, the taste profiles can include other information. For example, the taste profiles can include libraries and/or playlists of media content items associated with the user. The taste profiles can also include information about the relationships of the user with other users.

The taste profiles can be used for a number of purposes. One use of taste profiles is for creating personalized recommendations, where the contents of a taste profile are used to represent an individual's taste. This API call uses a taste profile as a seed for obtaining recommendations or playlists of similar artists.

Another use of taste profile is to create a taste vector. A user taste vector is a vector within a vector space that represents the user taste profile. The user taste profile is used as a seed for determining artist affinity (or an affinity based on other attributes).

A taste profile can represent a single user or multiple users. Conversely, a single user or entity can have multiple taste profiles. For example, one taste profile can be generated in connection with a media content play activity of the user, whereas another separate taste profile can be generated for the same user based on the selection of media content items and/or artists of the user for a playlist.

Figure 3:
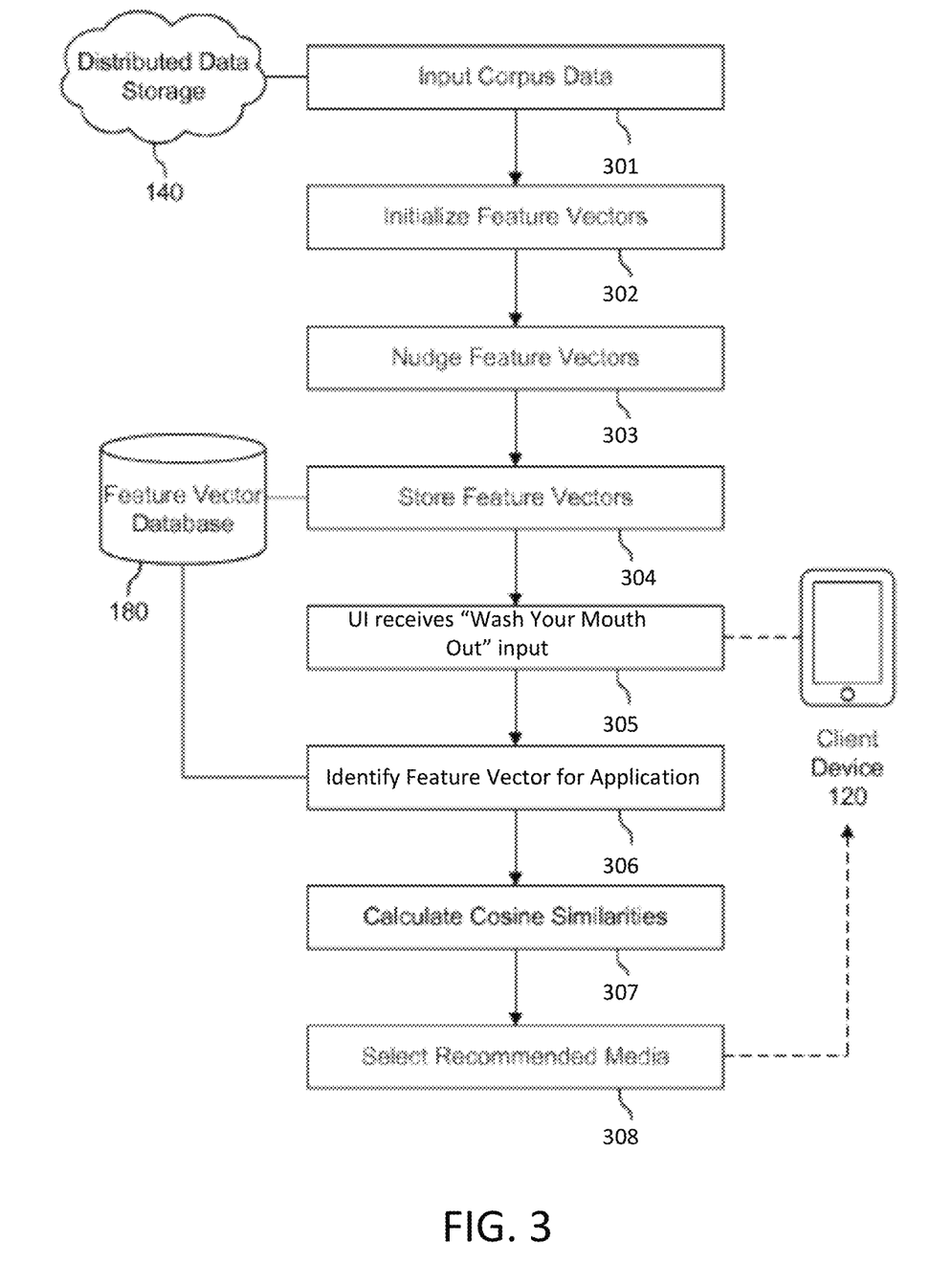
FIG. 3 is a flow diagram for explaining a process for recommending non-explicit media content according to an example embodiment.

Briefly, in FIG. 3, corpus data from distributed data storage 140 is input into vector engine 150. Vector engine 150 initializes feature vectors, each feature vector representing an object from the corpus data. The vector engine 150 nudges the feature vectors based on co-occurrences of the objects in the corpus data and then stores the feature vectors in feature vector database 180. Client device 120 then detects that a user desires to listen to non-explicit media content items and vector engine 150 identifies a feature vector among the feature vectors stored in feature vector database 180 associated with the seed track. Vector engine 150 then calculates cosine similarities between the feature vector associated with the seed track and other feature vectors stored in feature vector database 180. The calculated cosine similarities define similarities and differences between the objects and can then be used by the vector engine 150 to select a media content item or a media content list and/or recommend a media content item or media content list to a user.

In more detail, in step 301, corpus data is inputted into vector engine 150 in order to train vector engine 150 on the contexts that relate or differentiate various objects. The corpus data may be collected, for example, from distributed data storage 140 and may include media object database 142, each media object database 142 containing metadata associated with a plurality of media content items stored in media content database 130, and each media content list having a title. The media content lists may each also include or be linked to one or more tags, each tag associating a word or phrase to the respective media content list. The corpus data may also include word vector database 143 and text corpus database 144, as well as interaction database 141, including a plurality of interaction histories, each interaction history containing metadata associated with a plurality of media content items in media content database 130. The corpus data provides data on various co-occurrences of objects, for example, two media content items contained in the same media content list, a common word appearing in the titles of two different media content lists, two media content items found in the same interaction history, a word found in a title of a media content list and also appearing in a document of the text corpus data, and so forth.

In step 302, vector engine 150 includes a neural network or vector encoding toolset that initializes feature vectors for various objects in the corpus data. For example, feature vectors may be initialized for each media content list, each word in the titles of the media content lists, each word contained in the text corpus data, each tag of the plurality of media content lists, each interaction history, each media content item, and so forth. The initialized feature vectors are numerical vector representations of each media content items, each feature vector comprising n-dimensions each quantifying a latent feature of the media content items. In examples described herein, each feature vector is comprised of 40 dimensions, but feature vectors of any number of dimensions may be initialized. Generally speaking, a greater number of dimensions allows for increased specificity in defining the similarities and differences between media content items, but demands increased computational resources when initializing or performing computations on the feature vectors.

In step 303, vector engine 150 nudges the feature vectors based on co-occurrences of the respective media content items within the corpus data. Nudging of the feature vectors involves modifying the numerical values of the feature vectors using one or a combination of known computational algorithms including, but not limited to, gradient descent, stochastic gradient descent, Continuous Bag-of Words (CBOW), Skip-Gram, hierarchical soft-max or negative sampling.

In step 304, the features vectors are stored by vector engine 150 in feature vector database 180. The stored feature vectors may be routinely updated by performing additional computations on the feature vectors based on newly inputted or updated corpus data or newly identified co-occurrences between objects in the corpus data. The stored feature vectors are accessible to vector engine 150 for further computations as well as to applications and devices external to vector engine 150 such as additional applications connected to media distribution platform 110.

In step 305, the user interface receives a "Wash Your Mouth Out" input. The "Wash Your Mouth Out" option plays media content items that do not include explicit content. This action can be detected by vector engine 150 or by client device 120. In one example, the user may desire a clean version of tracks for a general music taste. In another example, the user may need to listen to clean tracks while currently listening to music. When the user selects the "Wash Your Mouth Out" application, they may be prompted to select a seed track. Alternatively, the track that a user is currently listening to becomes the seed track.

In step 306, vector engine 150 identifies, among the feature vectors stored in feature vector database 180, a feature vector corresponding to the seed track.

In step 307, vector engine 150 calculates the cosine similarities between the feature vector associated with the seed track identified in step 306 and other feature vectors stored in feature vector database 180 (i.e. the distance between the two vectors in the vector space).

In step 308, vector engine 150 sorts the computed cosine similarities to identify various media content items from the corpus data that are closest in the vector space to the application selected in step 305 and selects one or more of the objects to be recommended to an end-user, for example, through a media streaming application running on client device 120.

In an embodiment, a user selects a "Wash Your Mouth Out" application. The seed track may be the track that is already playing on the media streaming application of the user.

Figure 4:
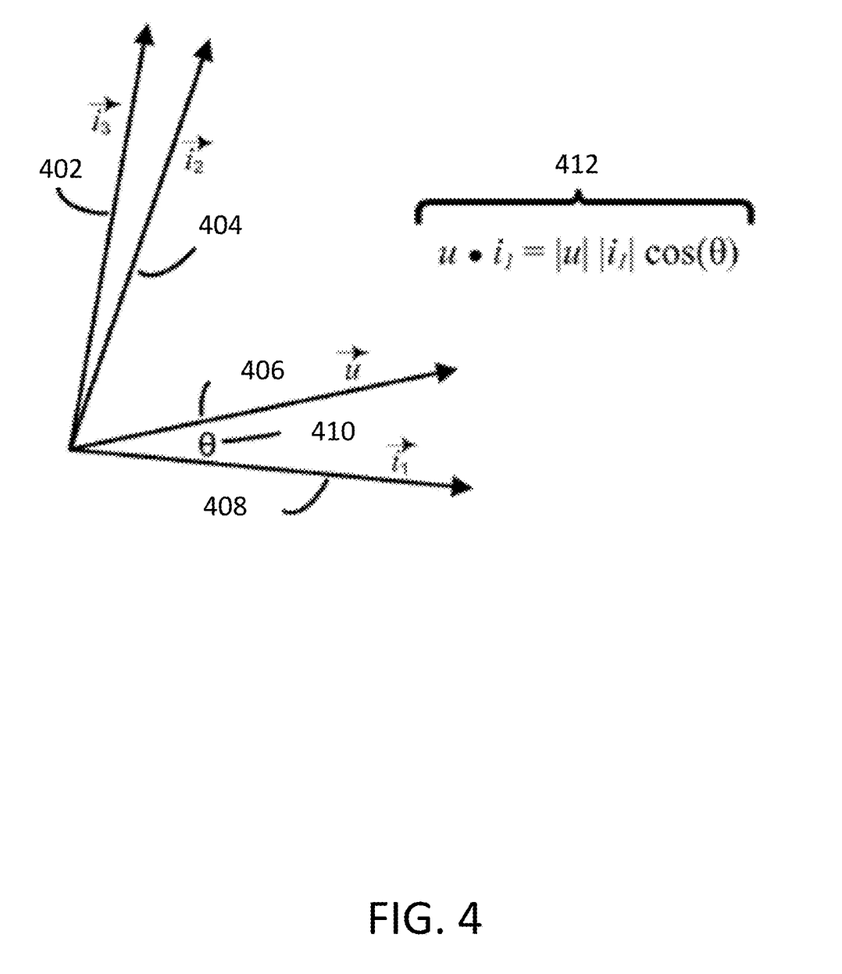
FIG. 4 illustrates geometrically user and item vectors, and the angles between them in accordance with some implementations.

FIG. 4 illustrates geometrically a user taste vector 406, and three related items vectors 402, 404, and 408. Although depicted here in two dimensions, the vectors may have any number of components (e.g., 20 dimensions, 40 dimensions, or 100 dimensions). In FIG. 4, the angle between the user taste vector 406 and item vector $i_1$ is θ 410. As known in the art, the inner product (or dot product) of two vectors is the product of their lengths times the cosine of the angle between the vectors, as illustrated in the formula 412. Assuming $i_1$, $i_2$, and $i_3$ in FIG. 4 are item vectors corresponding to media content items, the items most similar to each other are $i_2$, and $i_3$ because they are the closest together. If a user likes item $i_2$, then there is a reasonable chance the user will also like $i_3$, but interest in $i_1$ is less likely.

Figure 5:
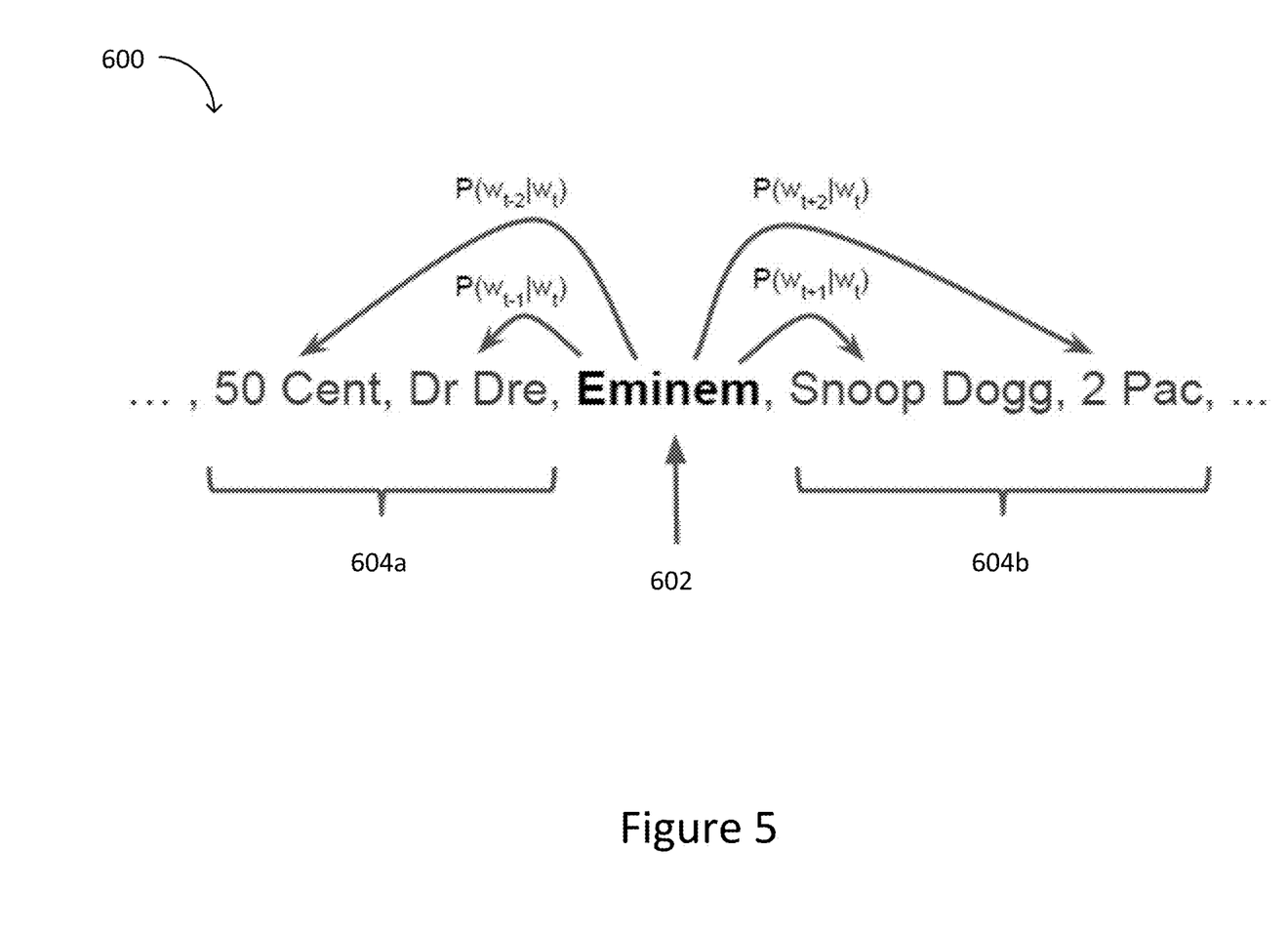
FIG. 5 illustrates an example vector model.

An example vector model is shown in FIG. 5 using tracks. The vector model 600 is created across all playlists with greater than 50% explicit tracks. All of the tracks, explicit or not, are included in the model. This model takes input as tracks and produces a vector space, such that tracks sharing a common attribute are located in close proximity to each other. As shown, input 602 is a track by Eminem. The input 602 is also herein referred to as a "seed track." In this example, tracks 604a, 604b by a similar artist are mapped. Dr. Dre and Snoop Dogg are within one deviation from the input 602, and 50 Cent and 2Pac are within two deviations from the input 602. The related tracks (or artists) are calculated by P(wt-2/wt) for a second deviation and P(wt-1/wt) for a first deviation. Tracks 604a, 604b are also known as contexts, which may include, but are not limited to, genre, album, etc. The model includes tracks with explicit lyrics as well as tracks with non-explicit lyrics.

In alternative embodiments, tracks may be ranked based on how many explicit lyrics the track contains, or the severity of the explicit lyrics. For example, in a conservative case, a track containing any explicit lyrics may be filtered out, while in a liberal case, a track containing more than 25% explicit lyrics may be filtered out.

Further, users may opt out of hearing a specific artist. When a history of a user has shown that the user continually skips tracks by a particular artist, the model does not include tracks by that artist in the clean playlist.

Figure 6:
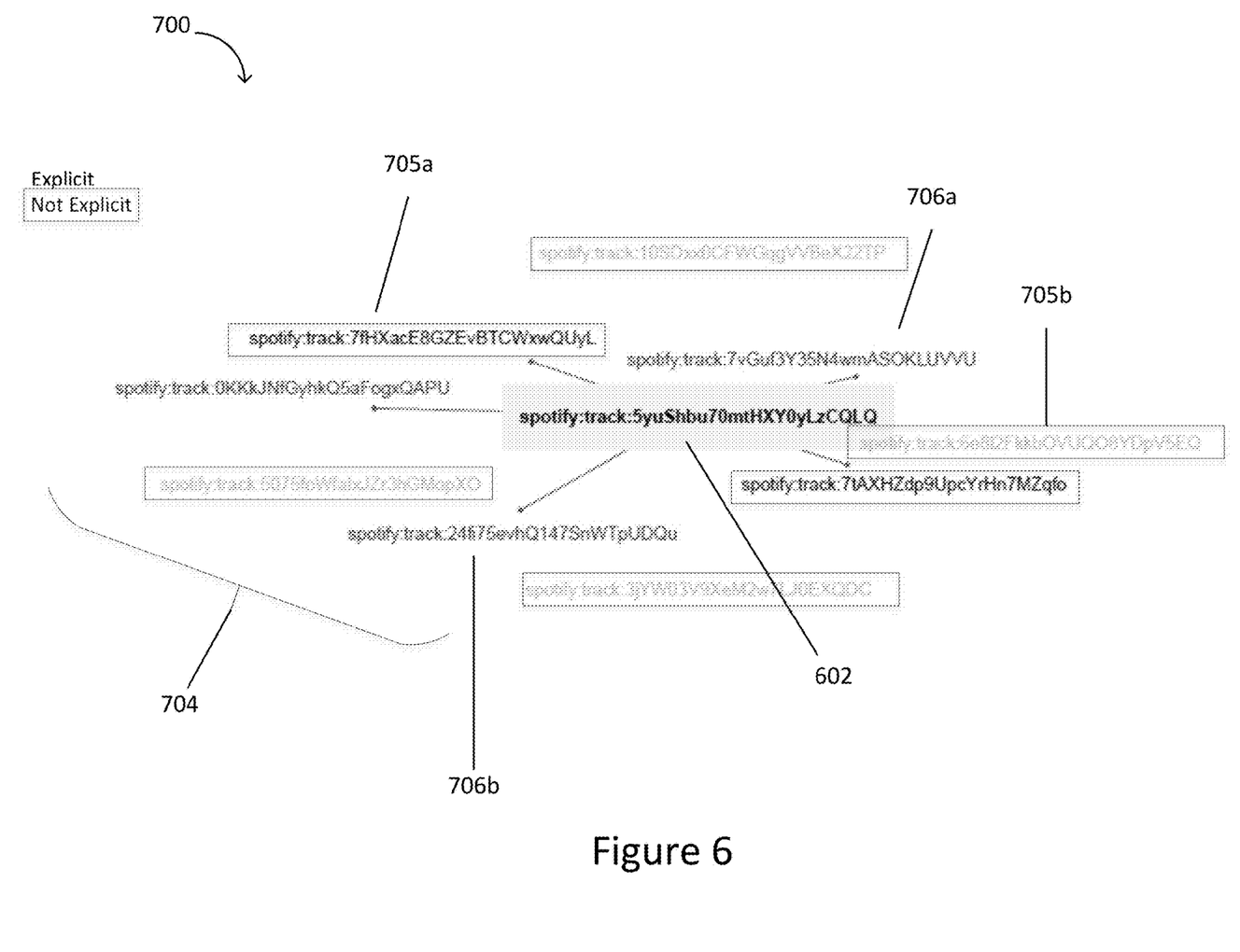
FIG. 6 illustrates an example embodiment of tracks arranged by cosine distance.

FIG. 6 illustrates an example vector space 700 with tracks arranged by cosine distance. Tracks that are closely arranged have a high cosine value. The process begins with an input 602 (also known as a "seed track"). The input 602 may or may not be a track with explicit lyrics. After the seed track has been identified, the related tracks 705a, 705b, 706a, 706b are identified. Related tracks include tracks with and without explicit lyrics. The related tracks 704 are arranged in a vector space 700. A further-away track represents a track that has a lower amount of similarity to the input 602. Similarity includes the same artist, same genre, and tracks that generally show up in the same playlists by users, etc.

In another embodiment, the vector space of FIG. 6 is created by an automated system that clusters tracks into a space by collecting playlist data and similarities across playlists that comprise the same tracks. The clustering may be done, for example, by calculating the pairwise cosine distance between two vectors among the plurality of vector representations. If the pairwise cosine distance is below a threshold value, the two vectors are merged into a cluster. The two vectors are removed from the plurality of vector representations and a cluster vector representation of the two vectors is calculated, for example, as the mean of all vectors in the cluster. The cluster vector representation is reinserted into the plurality of vector representations and the clustering heuristic is repeated until a desired number of clusters is achieved.

Figure 7:
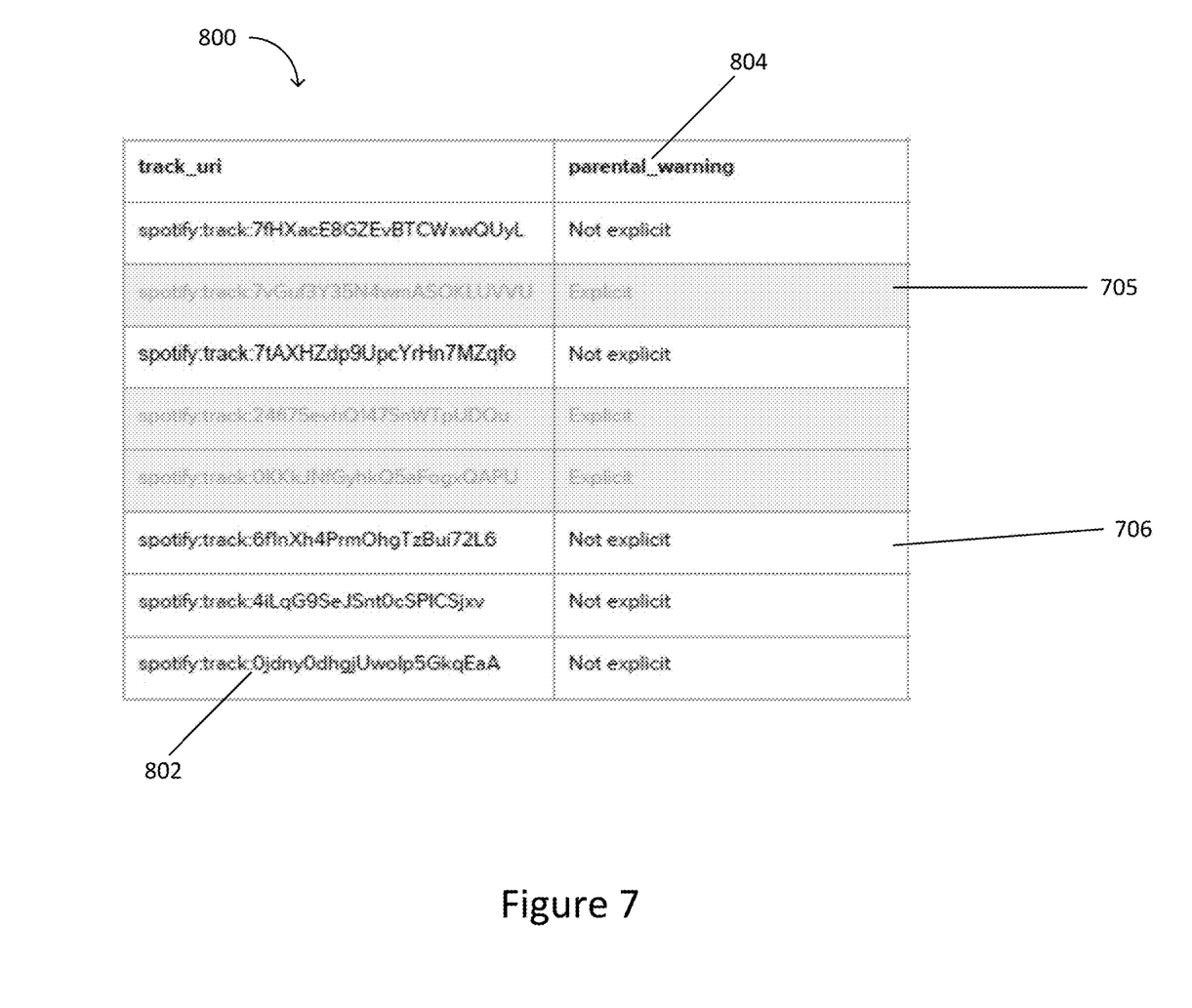
FIG. 7 illustrates an example list of related tracks from the model.

FIG. 7 illustrates an example results table 800 from the vector space of FIG. 6. Instead of being arranged in a 3-D space, the tracks are listed in order of cosine value. All tracks with a high cosine value represent tracks that are near the seed track in the vector space. The tracks are arranged in a list according to descending affinity score. The tracks listed include both explicit tracks 705 and non-explicit tracks 706.

The results table 800 is configured to identify one or more media content items (i.e., tracks) by track identifiers 802. The results table 800 is also configured to indicate whether or not the track contains a parental warning 804. Parental warning labels are placed on audio recordings that have excessive profanities or inappropriate references. The parental warning is added to tracks by the record label to material with strong language or depictions of violence, sex, or substance abuse to such an extent as to merit parental notification. Still further, parental warnings are added to tracks by the record label to material that includes racist, homophobic, misogynistic, or other discriminatory language or behavior.

Figure 8:
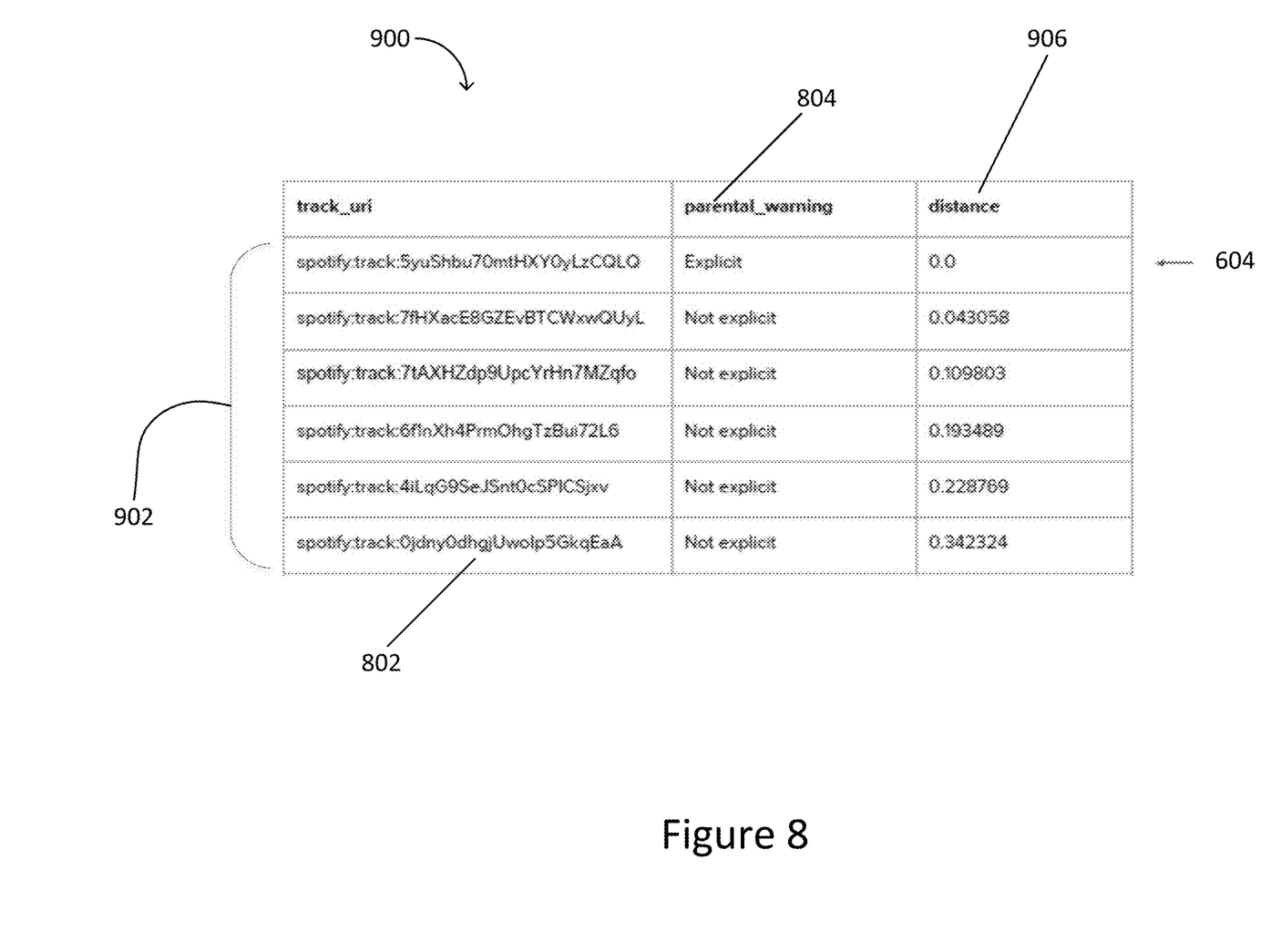
FIG. 8 illustrates an example list of related tracks without tracks having explicit content.

FIG. 8 shows an example of a filtered results table 900. The filtered results table 900 is a table created using the vector space with explicit tracks removed (with the exception of the seed track) from the results table of FIG. 8. The results 902 are sorted by distance 906 (representing a similarity score) from the seed track 604. The distance may be a cosine distance calculated using the vector space model. Tracks with a smaller distance are listed higher in the list because they are more closely related to the seed track 604.

Figure 9:
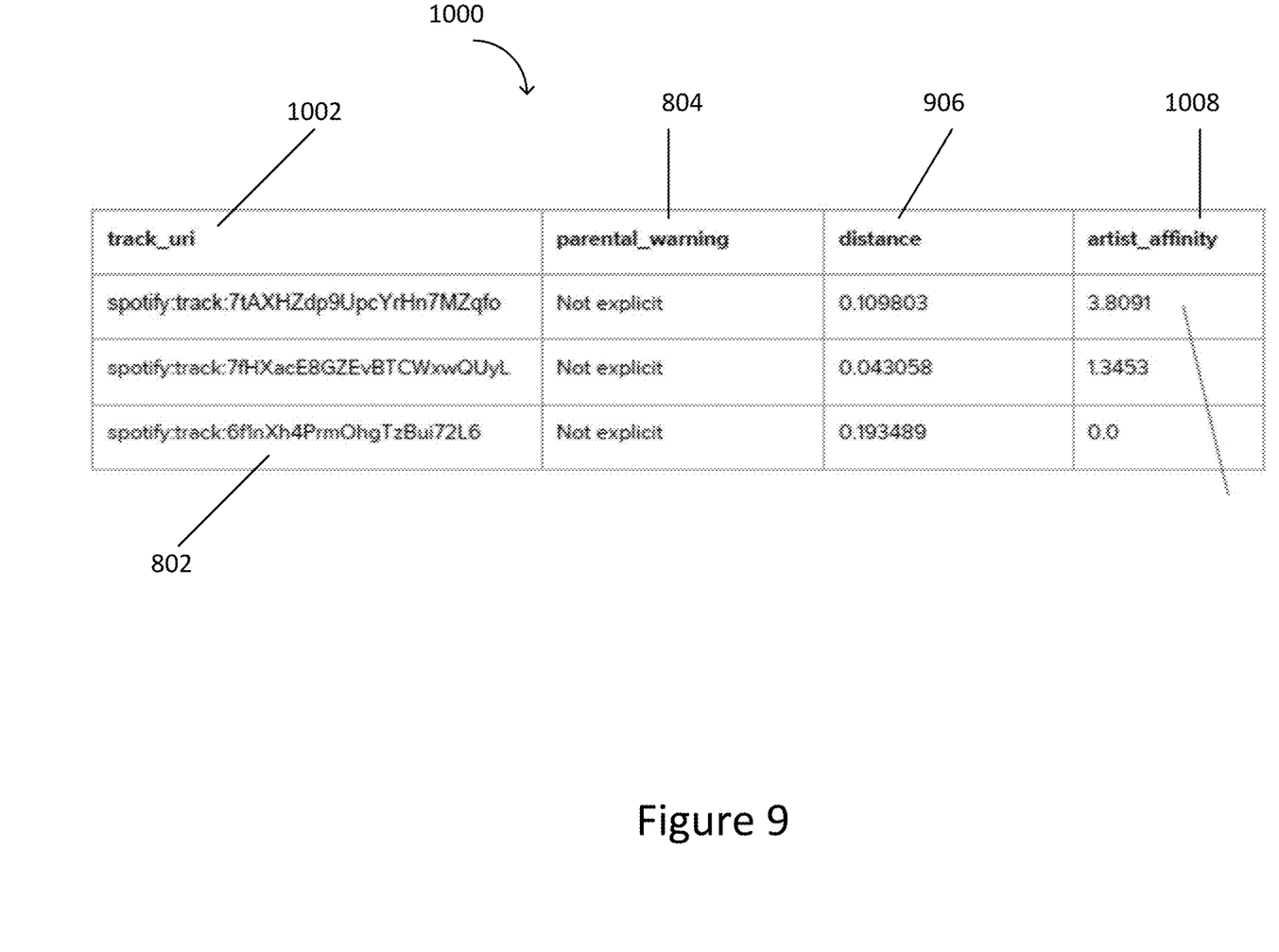
FIG. 9 illustrates an example list of related tracks without tracks having explicit content sorted based on artist affinity.

FIG. 9 illustrates an example customized results table 1000 that is customized to a specific user. The results table of FIG. 8 has been rearranged based on an artist affinity score 1008 (also referred to herein as an affinity score). The customized results table 1000 includes tracks 1002 that are not explicit (i.e., have no parental warning), have a small distance 906, and a high artist affinity score 1008. It should be noted that the affinity score is not necessarily based on artist, but may be based on other attributes, such as genre, album, etc. The tracks with the highest affinity are the tracks most similar sounding to the seed track, and assumed to be desirable to the user.

Figure 10:
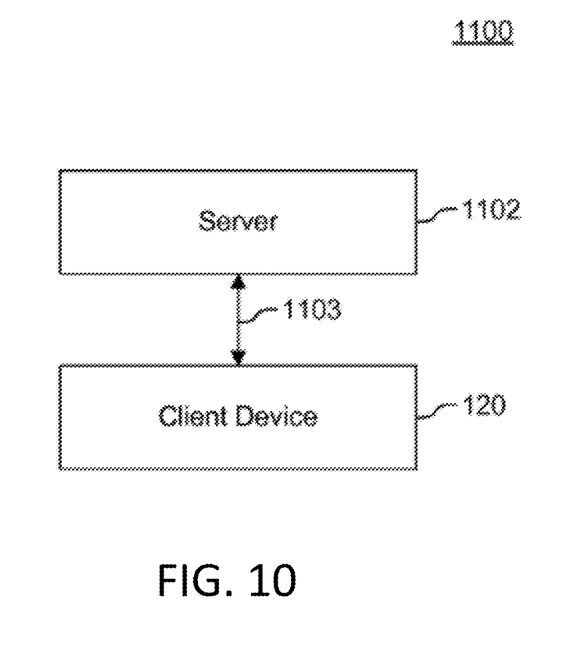
FIG. 10 is a block diagram of an example client-server data system according to an example embodiment.

FIG. 10 is a block diagram of an example client-server data system 1100 configured in accordance with the principles of the invention. Data system 1100 can include server 1102 and client device 120. In some embodiments, data system 1100 can include multiple servers 1102, multiple client devices 120, or both multiple servers 1102 and multiple client devices 120. For simplicity, only one server 1102 and one client device 102 are illustrated.

Server 1102 may include any suitable types of servers that can store and provide data to client device 102 (e.g., file server, database server, web server, distributed server, clustered servers, or a media server). Server 1102 can store data, and server 1102 can receive data download requests from client device 120.

In some embodiments, server 1102 can obtain and process data from one or more client devices 120.

Server 1102 can communicate with client device 102 over communications link 1103. Communications link 1103 can include any suitable wired or wireless communications link, or combinations thereof, by which data may be exchanged between server 1102 and client device 120. For example, communications link 1103 can include a satellite link, a fiber-optic link, a cable link, an Internet link, or any other suitable wired or wireless link Communications link 1103 may enable data transmission using any suitable communications protocol supported by the medium of communications link 1103. Such communications protocols may include, for example, Wi-Fi (e.g., a 802.11 protocol). Ethernet, Bluetooth™, radio frequency systems (e.g., 900 MHz, 2.4 GHz, and 5.6 GHz communication systems), infrared, TCP/IP (e.g., and the protocols used in each of the TCP/IP layers), HTTP. BitTorrent, FTP, RTP, RTSP, SSH, any other communications protocol, or any combination thereof.

Client device 120 can include any electronic device capable of communicating and/or displaying or providing data to a user and may be operative to communicate with server 1102. For example, client device 120 can include a portable media player, a cellular telephone, pocket-sized personal computer, a desktop computer, a laptop computer, a tablet, and any other device capable of communicating via wires or wirelessly (with or without the aid of a wireless-enabling accessory device).

Figure 11:
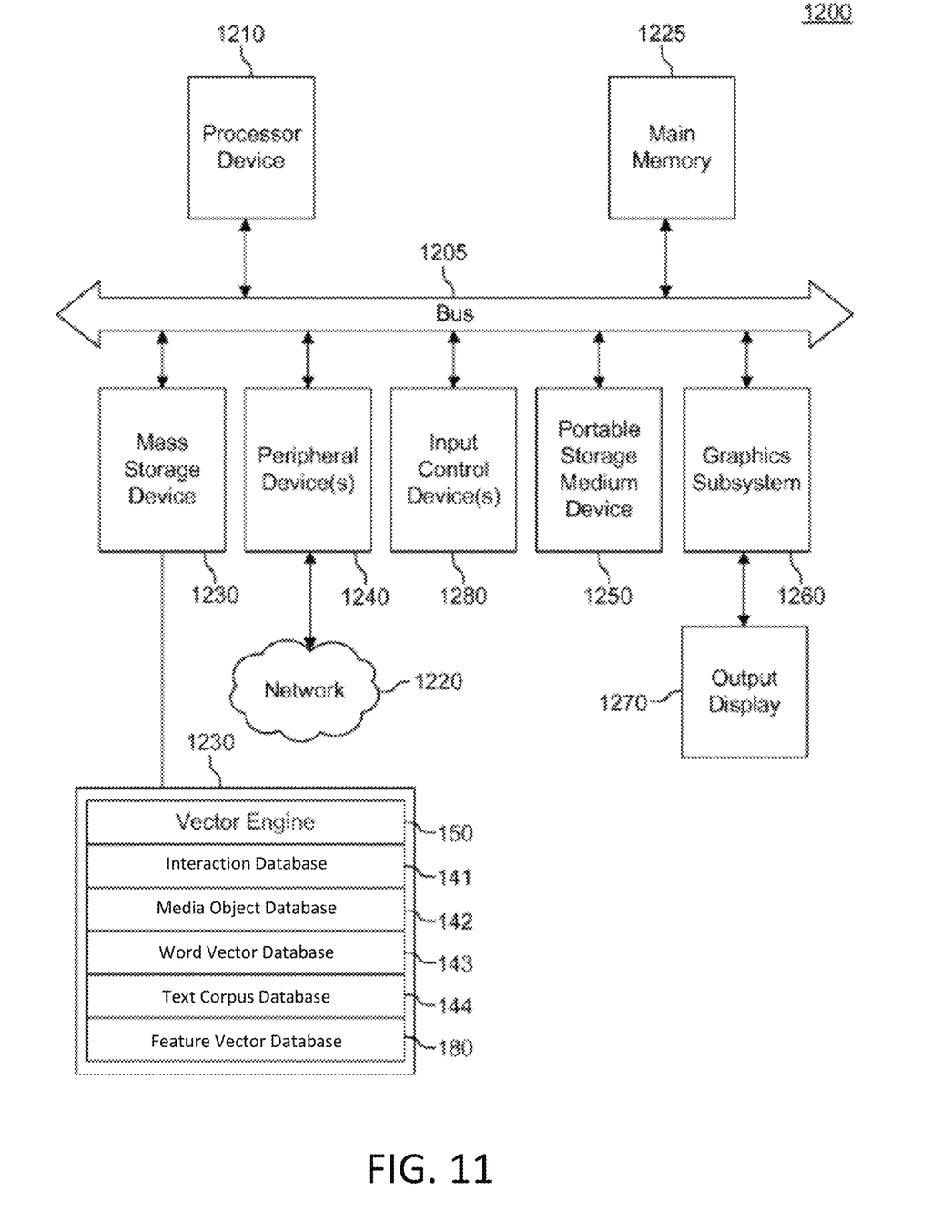
FIG. 11 is a block diagram of a special purpose server-side computer constructed to realize the server-side functionality of the example embodiments.

FIG. 11 is a block diagram of a special purpose server-side computer 1200 constructed to realize the server-side functionality of the example embodiments. Computer 1200 may include any of processor device 1210, main memory 1225, bus 1205, mass storage device 1230, peripheral devices 1240, input control devices 1280, portable storage medium device 1250, graphics subsystem 1260, and output display 1270.

The mass storage device 1230 of server-side computer 1200 stores vector engine 150. Additionally, mass storage device 1230 may optionally store interaction database 141, media object database 142, word vector database 143, text corpus database 144 or feature vector database 180 extracted from distributed data storage 140.

Computer 1200 might be incorporated in a stand-alone apparatus or in a multi-component apparatus, such as for grid computing in a cluster of servers or a distributed file system.

Each component of the client device 120 and computer 1200 may represent a broad category of a computer component of a general and/or special purpose computer Components of the client device 120 and computer 1200 are not limited to the specific implementations provided herein.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable," "machine-accessible medium," or "machine-readable medium," used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. Determining a clean media content item to play based on a seed media content item that is selected or currently playing, wherein the seed media content item includes explicit content, by:
   receiving the seed media content item at an information storage and media distribution platform from a database of a plurality of media content items;
   creating a vector space comprising the seed media content item and a plurality of related media content items, the related media content items including explicit media content items, each explicit media content item including explicit content, and a plurality of clean media content items, each clean media content item not including explicit content, wherein none of the plurality of clean media content items is the seed media content item with the explicit content in the seed media content item removed or altered;
   calculating a similarity score between the seed media content item and the plurality of related media content items;
   removing explicit media content items from the plurality of related media content items;
   determining an affinity score for each of the plurality of clean media content items; and
   determining the clean media content item to play based on the affinity score and similarity score for each of the plurality of clean media content items; and playing the clean media content item from the plurality of clean media content items.

2. The method according to claim 1, wherein the similarity score is calculated using a cosine similarity function.

3. The method according to claim 1, wherein the affinity score is calculated by comparing the plurality of related media content items to a user's listening history.

4. The method according to claim 1, wherein the plurality of related media content items are taken from playlists that comprise at least 50% explicit media content items.

5. The method according to claim 1, further comprising generating a list of media content items from the plurality of clean media content items in an order based on the affinity score.

6. The method according to claim 1, wherein the seed media content item is an audio track and the plurality of related media content items are selected from a plurality of audio tracks.

7. A system comprising a non-transitory memory and a processing device coupled to the memory and constructed to execute the process steps stored in the memory, wherein the stored process steps include steps which when executed by the processor cause the processor to perform the steps of:
   determining a clean media content item to play based on a seed media content item that is selected or currently playing, wherein the seed media content item includes explicit content, by:
      receiving the seed media content item at an information storage and retrieval platform from a database of a plurality of media content item;
      creating a vector space comprising the seed media content item and a plurality of related media content items, the related media content items including explicit media content items, each explicit media content item including explicit content, and a plurality of clean media content items, each clean media content item not including explicit content, wherein none of the plurality of clean media content items is the seed media content item with the explicit content in the seed media content item removed or altered;
      calculating a similarity score between the seed media content item and the plurality of related media content items;
      removing explicit media content items from the plurality of related media content items;
      determining an affinity score for each of the plurality of clean media content items; and
      determining the clean media content item to play based on the affinity score and the similarity score for each of the plurality of clean media content items; and playing the clean media content item from the plurality of clean media content items based.

8. The system according to claim 7, wherein the similarity score is calculated using a cosine similarity function.

9. The system according to claim 7, wherein the affinity score is calculated by comparing the plurality of related media content items to a user's listening history.

10. The system according to claim 7, wherein the plurality of related media content items are taken from playlists that comprise at least 50% explicit media content items.

11. The system according to claim 7, further comprising generating a list of media content items from the plurality of clean media content items in an order based on the affinity score.

12. The system according to claim 7, wherein the seed media content item is an audio track and the plurality of related media content items are selected from a plurality of audio tracks.

13. The method of claim 1, wherein the seed media content item is a currently playing media content item.

14. The system of claim 7, wherein the seed media content item is a currently playing media content item.

15. The method according to claim 1, wherein calculating the similarity score between the seed media content item and the plurality of related media content items comprises determining if the plurality of related media content items are in one or more playlists that include the seed media content item.

16. The system according to claim 7, wherein calculating the similarity score between the seed media content item and the plurality of related media content items comprises determining if the plurality of related media content items are in one or more playlists that include the seed media content item.

17. The method according to claim 1, wherein calculating the similarity score between the seed media content item and the plurality of clean media content items comprises comparing the plurality of related media content items to a user's taste profile.

18. The system according to claim 7, wherein calculating the similarity score between the seed media content item and the plurality of clean media content items comprises comparing the plurality of related media content items to a user's taste profile.

* * * * *

UNITED STATES PATENT AND TRADEMARK OFFICE
CERTIFICATE OF CORRECTION

PATENT NO. : 11,531,698 B2
APPLICATION NO. : 16/123300
DATED : December 20, 2022
INVENTOR(S) : Vince Allen and Deepti Deshpande It is certified that error appears in the above-identified patent and that said Letters Patent is hereby corrected as shown below:

In the Claims

In Claim 1, Column 13, Line 9 "Determining" should read "A method, comprising: determining....".

In Claim 7, Column 14, Line 21 "media content items based." should read "media content items."

Signed and Sealed this
Twenty-eighth Day of February, 2023

Katherine Kelly Vidal
*Director of the United States Patent and Trademark Office*